W. J. WILLIAMSON.
HOSE COUPLING.
APPLICATION FILED OCT. 10, 1907.
929,067.
Patented July 27, 1909.
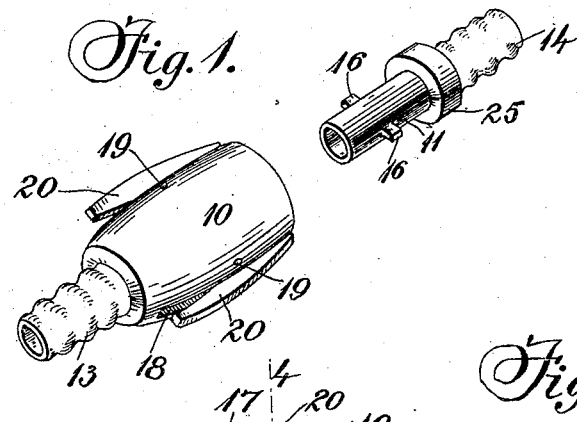
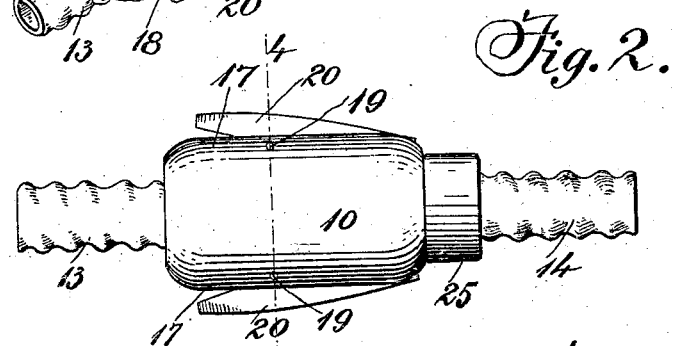
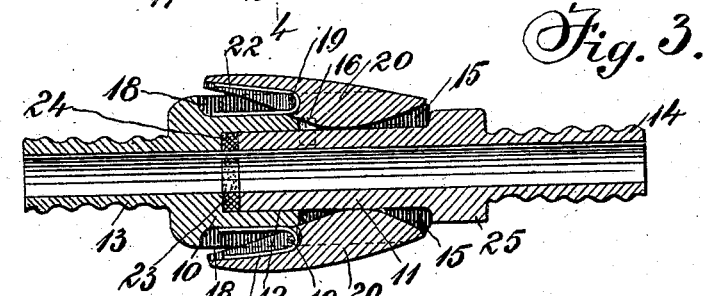
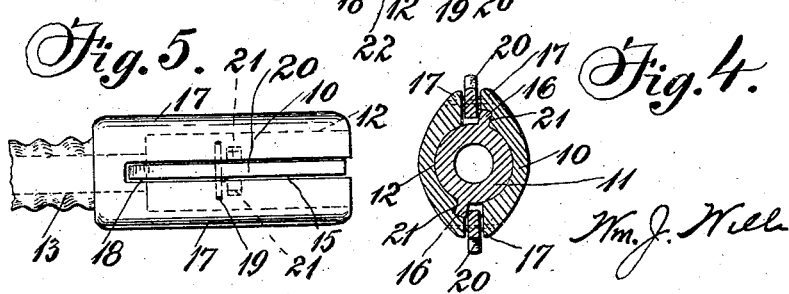

UNITED STATES PATENT OFFICE.

WILLIAM J. WILLIAMSON, OF LEWISTOWN, ILLINOIS.

HOSE-COUPLING.

No. 929,067.     Specification of Letters Patent.     Patented July 27, 1909.

Application filed October 10, 1907. Serial No. 396,812.

*To all whom it may concern:*

Be it known that I, WILLIAM J. WILLIAMSON, a citizen of the United States, residing at Lewistown, in the county of Fulton and State of Illinois, have invented certain new and useful Improvements in Hose-Couplings, of which the following is a specification.

This invention relates to hose-couplings, and has for its object to provide a simple and efficient device of this kind by means of which a coupling can be readily made without the use of a wrench or other tool.

In the accompanying drawing Figure 1 is a perspective view of the coupling-members disconnected. Fig. 2 is an elevation of the two members assembled. Fig. 3 is a longitudinal section thereof. Fig. 4 is a cross-section on the line 4—4 of Fig. 2. Fig. 5 is a plan view of the female member of the coupling.

In the drawing, 10 denotes the female, and 11 the male member of the coupling.

The member 10 comprises a tubular body the bore 12 of which receives the member 11 at a snug fit. The members have integral extensions 13 and 14, respectively, which are corrugated on the outside to receive the hose-sections to which the coupling is applied, the hose-sections being secured in the usual manner. The extensions may be threaded or otherwise constructed according to the construction of the parts to which the coupling is to be applied.

The member 10 has diametrically-opposite bayonet-slots 15 which communicate with the bore 12, and on the outside of the member 11 are diametrically-opposite lugs 16 adapted to enter the bayonet-slots and thus form a bayonet-joint. Adjacent the bayonet-slots the wall of the member 10 is enlarged or thickened as indicated at 17, and behind the rear end of said slots the enlargement has a groove 18 in which is pivotally mounted on a transverse pin 19 a latch 20 adapted to enter the longitudinal portion of the bayonet-slots and to extend across the entrance to the transverse portion 21 thereof.

To assemble the coupling, the member 11 is inserted in the bore of the member 10 with the lugs 16 entering the longitudinal portions of the bayonet-slots, and when the lugs reach the transverse portions thereof, the member 11 is given a slight turn so as to bring the lugs thereinto, whereby the members become locked against longitudinal withdrawal. The lugs are locked in this position by the latches 20 which extend across the entrance to the transverse portions of the bayonet-slots and thereby prevent turning of the members in the direction to withdraw the lugs therefrom. The inner faces of the latches are beveled by reason of which they will be pushed outwardly away from the entrance to the transverse portion of the bayonet-slots upon being engaged by the lugs 16 when they are slid along the longitudinal portion of the slots, and after the lugs enter said transverse portions, the latches drop behind the same whereby they are locked as heretofore described. In the groove 18 are springs 22 which bear on the latches and press them into locking position.

The diameter of the bore of the extension 14 is less than that of the bore 12 so that a shoulder 23 is formed, and between said shoulder and the inner end of the member 11 is a gasket 24. The member 11 has a collar 25 which abuts against the outer end of the member 10 when the parts are assembled.

The coupling herein described is simple in construction, reliable in operation, and it has no complicated parts to get out of order. The two members can be readily assembled and disconnected without the use of a wrench or other tool.

I claim:—

A hose coupling comprising a male member having diametrically opposing outwardly projecting lugs, a female member which receives the first mentioned member and is provided with diametrically opposite enlargements, and with bayonet slots through said enlargements to receive the said lugs, and further has grooves extending inwardly from the inner ends of the straight portions of said slots, spring latches pivoted in said grooves and projecting at their outer ends into the slots across the angular portions thereof, and bow-springs mounted in said grooves and pressing against the inner ends of said latches to project the same beyond the surface of the female member.

In testimony whereof I affix my signature, in presence of two witnesses.

WILLIAM J. WILLIAMSON.

Witnesses:
    CRESS V. GROAT,
    ALMA BORDNER.